(12) United States Patent
Conley

(10) Patent No.: US 9,881,325 B1
(45) Date of Patent: Jan. 30, 2018

(54) REAL-TIME PROVISION OF RATINGS INFORMATION AND CROWD-SOURCING OF RATINGS AND REVIEWS

(71) Applicant: Google Inc., Mountain View, CA (US)

(72) Inventor: James Edward Conley, Sunnyvale, CA (US)

(73) Assignee: Google LLC, Mountain View, CA (US)

(*) Notice: Subject to any disclaimer, the term of this patent is extended or adjusted under 35 U.S.C. 154(b) by 901 days.

(21) Appl. No.: 13/718,447

(22) Filed: Dec. 18, 2012

(51) Int. Cl.
  G06Q 30/00 (2012.01)
  G06Q 50/00 (2012.01)
  G06Q 30/02 (2012.01)
  G06Q 30/06 (2012.01)

(52) U.S. Cl.
  CPC ......... G06Q 30/0282 (2013.01); G06Q 30/00 (2013.01); G06Q 30/0601 (2013.01); G06Q 50/01 (2013.01)

(58) Field of Classification Search
  CPC ..... G06Q 30/08; G06Q 50/01; G06Q 30/0601
  USPC .................................................. 705/1.1, 319
  See application file for complete search history.

(56) References Cited

U.S. PATENT DOCUMENTS

| | | | |
|---|---|---|---|
| 7,092,508 B2 * | 8/2006 | Brown et al. | 379/265.06 |
| 7,797,379 B2 | 9/2010 | Hawkins | |
| 8,121,839 B2 | 2/2012 | Srivastava et al. | |
| 2008/0152097 A1 * | 6/2008 | Kent | 379/93.01 |
| 2008/0253544 A1 * | 10/2008 | Brown et al. | 379/201.12 |
| 2010/0124916 A1 | 5/2010 | Kim et al. | |
| 2011/0265153 A1 | 10/2011 | Guccione et al. | |
| 2012/0196581 A1 * | 8/2012 | Papakipos et al. | 455/415 |

* cited by examiner

Primary Examiner — Sangeeta Bahl
(74) Attorney, Agent, or Firm — Shumaker & Sieffert, P.A.

(57) ABSTRACT

A system and method are provided for providing review and ratings information and for crowd-sourcing reviews and ratings in real-time based on activity of an entity to be rated. The system may include a storage device, a voice server, and a ratings server. The method may include receiving a notification of an action initiated by the entity being rated, receiving identifying information associated with the entity, outputting the identifying information on a display device, and prompting for a rating for the entity.

18 Claims, 4 Drawing Sheets

REAL-TIME PROVISION OF RATINGS INFORMATION AND CROWD-SOURCING OF RATINGS AND REVIEWS

BACKGROUND

Businesses are continuously looking for new ways to attract potential customers to their products and services. However, in order to create the attraction, businesses must first interact with the potential customers.

From a potential customer's point of view, an interaction with a business can be a positive experience, a negative experience, or a neutral experience. When a potential customer is contacted by a business, the amount of benefit provided to the customer or, alternatively, the level of annoyance to the customer, depends on the compatibility between the business and the potential customer as well as the method of contact chosen by the business. Businesses interact with potential customers via advertisements through a variety of different media channels, including web pages, television, radio, magazines, billboards, and newspapers, among others. Bulk advertising methods are minimally intrusive, as potential customers are able to continue going about their everyday lives without diverting a significant amount of attention to the advertisements. However, businesses may also attempt to contact potential customers directly by emailing them, contacting them through text messages, or contacting them via voice calling.

Such methods of direct advertising can create a dilemma for potential customers. The potential customer can choose to limit the amount of interference created by the direct advertisement by simply ignoring the direct advertisement attempt. However, ignoring the advertisement involves both an opportunity cost (i.e., the advertisement may have presented a valuable opportunity that the potential customer is now unable to take advantage of) and an error cost (i.e., what the potential customer thought was an advertisement was actually some other event that may have provided value). The potential customer can also choose to divert substantial attention to the direct advertisement at the risk that the diversion will amount to nothing more than a substantial interference with everyday life.

Potential customers would benefit from additional information in making better choices with respect to events that may potentially be direct advertisement attempts by a business. However, the potential customer often has little or no information regarding the business responsible for the direct advertisement. Furthermore, the potential customer frequently has no information regarding the content of the information the business may provide in the prospective interaction.

SUMMARY

One aspect of the disclosure provides a method for crowd-sourcing ratings of entities triggered by an action of an entity being rated. The method includes receiving a notification of a call placed from an entity to a callee; identifying the entity that initiated the call; identifying information associated with the identified entity; providing the information associated with the identified entity to a device associated with the callee; prompting the callee to provide a rating for the identified entity; and updating a data store with the rating provided by the callee.

Another aspect of the disclosure provides a system that includes a storage device, a voice server, and a ratings server. The storage device configured to store information associated with one or more entities. The voice server configured to receive calls, extract call data from the calls, transmit data to and receive data from a ratings server, and route VoIP (Voice over Internet Protocol) calls to one or more mobile devices. The ratings server configured to receive the data from the voice server, identify an entity based on the data received from the voice server, locate information associated with the identified entity in the storage device, send data associated with the information to the voice server, receive ratings data from the one or more mobile devices, and update the storage device with the ratings data received from the one or more mobile devices.

Yet another aspect of the disclosure provides a method for crowd-sourcing ratings of entities triggered by an action of an entity being rated. The method includes receiving a notification of an action initiated by the entity being rated; receiving identifying information associated with the entity; outputting the identifying information on a display device; and prompting for a rating for the entity.

DETAILED DESCRIPTION

Business review and ratings services provide valuable information to potential customers. For example, a potential customer can ascertain the level of compatibility between his or her wants and needs and the products and services purveyed by the business. Potential customers could vastly improve their decision-making by consulting business review and ratings services when choosing whether or not to interact with a business. However, it is often impossible or impractical for the potential customer to access business review and ratings services in real-time using conventional techniques. Some embodiments of the disclosure provide potential customers with access to business reviews and ratings in real-time, thereby improving potential customers' decision-making in choosing whether or not to divert attention towards a business' attempt to interact.

Furthermore, the informational content provided by business review and ratings services could be improved if a larger number of current and former customers provided ratings for the businesses. However, the effort required to access a review and ratings service and the additional effort required to provide a review and rating for a business may deter many potential reviewers from providing information to the review and ratings service. Additionally, an individual reviewer may not directly benefit by posting a review and rating to a service (i.e., because the individual reviewer already possessed the information that his or her review added to the service), so if the effort to post a review and rating is high, few reviews will be generated. Reducing the effort required to provide reviews and ratings could significantly increase the amount of information provided by reviewers and thereby increase a review and ratings service's value to potential customers.

Even where the effort required to review and rate a business is low, and a current or former customer is not deterred from accessing the review and ratings service in order to provide a review, a potential reviewer may simply not remember to provide a review and rating even though he or she at one point intended to do so. Such a potential reviewer may be reminded of an experience with a particular business when that business attempts to interact with the potential reviewer, but the potential reviewer may not even think to review the business during and/or after the interaction. Some embodiments provide for prompting a potential reviewer to provide a review and rating of a business while the potential reviewer is reminded of an experience with the business, thereby increasing the likelihood of the potential reviewer providing a review, increasing an amount of information stored by a business review and ratings service, and increasing the usefulness of the business review and ratings service to potential customers.

In an example embodiment, a communication directed to a user is received by a communication routing server or service, such as, for example, Google Voice. Such a communication may be an e-mail, an SMS message, an instant message (IM), an audio call through a voice over internet protocol (VoIP) network, an audio call through a cellular network, an audio call through a plain old telephone service (POTS) network, an audio-visual call over an internet protocol data network, an electronic advertisement, or any other medium by which a business may attempt to contact a potential customer. A communication may also occur where a business's advertisement is displayed to a user on one or more devices such as a smart phone, a tablet computer, a laptop computer, a desktop computer, a television, and any other device capable of accessing the Internet. In another example, the communication may be an advertisement presented on a traditional medium (for example, billboard) where the location of the advertisement is associated with a particular geographic location. In this example, a server may recognize that the user is in the presence of the advertisement by comparing the user's geographic location and the geographic location of the advertisement.

The communication routing service uses data associated with the communication to identify an entity responsible for initiating the communication and/or advertisement. For example, if the communication is a telephone call, a caller-line identification (CLID) can be used to identify the caller entity. In one implementation, the communication routing service identifies the entity initiating the call by performing a reverse look-up of the entity in a database of entity phone numbers. In some implementations, the communication routing service may identify the entity initiating the call by checking the callee's contact list to determine whether the caller identity information is already included in the callee's contact list.

If the communication routing service is successful in identifying the entity responsible for initiating the communication, then the communication routing service determines whether to request information about the entity from a business review and ratings service. Determining whether to request information from a business review and ratings service includes determining whether the identified entity is a business and/or determining whether the business review and ratings service has any information pertaining to the identified entity. In the event that the identified entity is a business, then the communication routing service requests information from the business review and ratings service for the identified entity.

In some cases, the communication routing service may not be successful in determining, within appropriate confidence levels, a single entity responsible for initiating the communication. In such circumstances, the communication routing service may identify multiple entities that are most likely responsible for initiating the communication and may also ascertain probabilities or probability ranges associated with individual entities being responsible for initiating the call. In the event that multiple entities are deemed to be sufficiently likely to have initiated the call, the communication routing service may determine whether to request information from a business review and ratings service for each of the entities. Determining whether to request information from a business review and ratings service includes determining whether the identified entity is a business and/or whether the business review and ratings service has any information pertaining to the identified entity. In the event that one or more businesses are deemed sufficiently likely to have initiated the communication, the communication routing service requests information from the business review and ratings service for the one or more businesses.

If the communication routing service successfully identified one or more entities responsible for initiating the communication, then the communication routing service transmits entity information acquired from the data store and the business review and ratings service to a user equipment (UE) when notifying the UE of the incoming communication. For example, if the communication is a telephone call, the communication routing service provides the UE with information about the calling entity and/or a rating of the calling entity and/or an interface to allow a user to provide a rating of the calling entity during or after the call. The information transmitted by the communication routing service with the incoming call notification may include, for example, a link to a ratings webpage, information necessary for an application to display the ratings webpage for the identified business, a request for a ratings application to load webpage or link, etc.

If the communication routing service is unable to identify a single entity responsible for initiating the communication but instead identified multiple entities sufficiently likely to have been responsible for initiating the communication, then the communication routing service transmits such entity information for each of the multiple entities to the UE. Additionally, in some embodiments, the communication routing service may transmit a request to the UE to prompt the user to identify, either during the call or after the call is completed, the single entity responsible for initiating the call from a list of entities sufficiently likely to have been responsible for initiating the communication. The prompt issued by the UE may also provide the user with the option of declaring that none of the entities sufficiently likely to have been responsible for initiating the communication actually initiated the communication and to specify an altogether different entity as having been responsible for initiating the communication. In the event that the user specifies an altogether different entity as having been responsible for initiating the communication, the communication routing service may receive the information input by the user pertaining to the identity of the entity and, if appropriate, request information pertaining to the identified entity from a business review and ratings service. In the event that the communication routing service is successful in obtaining information pertaining to the identified entity from the business review and ratings service, the communication routing service transmits the information to the UE.

In one implementation, the communication routing service may provide entity information to the UE through a data network and connect the incoming call through a telephony network and/or data network (i.e., for Internet-enabled calls, such as VoIP calls). In some cases, the communication routing service may use the same network to provide entity information to the UE and to connect the incoming call.

In the event that the user elects to rate the entity responsible for initiating the communication, the communication routing service receives the user's review and/or rating of the entity responsible for initiating the communication and transmits the information to the business review and ratings service.

In another example embodiment of providing business review and ratings information and crowd sourcing the generation of review and rating information in real-time, an incoming communication directed to a user equipment (UE) is received by the UE. A communication may also occur where a business's advertisement is displayed to a user. For example, the advertisement can be displayed on one or more of the user's devices, such as a smart phone, a tablet computer, a laptop computer, a desktop computer, a television, and any other device. In another example, the advertisement may be associated with a geographic location and a server is configured to identify that the user is within the vicinity of the advertisement based on location information received from one or more user devices.

In some embodiments, if the UE determines that it is appropriate to request an identity of the responsible entity from a server, then the UE may augment the identity request with a request that the server also return information provided by a business review and ratings service pertaining to the responsible entity in the event that the responsible entity can be identified. The second request may further be conditioned upon it being appropriate for the server to return information provided by a business review and ratings service. Alternatively, in some embodiments, the UE may first receive information pertaining to the identity of the responsible entity and subsequently request information provided by a business review and ratings service regarding the identified responsible entity. The second request may be made to a second server or the second request may be made to the same server to which the identity request was made. Furthermore, the second request may be made only after the UE determines that it is appropriate to request information provided by a business review and ratings service regarding the identified responsible entity. The information provided by a business review and ratings service may include one or more user reviews and/or ratings of the business, aggregate ratings of the business across various dimensions and on a scale provided by the review and ratings service, descriptions of the goods and services purveyed by the business, amenities provided by the business, and further characteristics of the business and the goods and services it provides. The user reviews and/or ratings of the business may be limited to reviews and/or ratings provided by a particular group, and the aggregate ratings may include multiple aggregations where the review and/or rating data used in a particular aggregation is limited to the reviews and/or ratings provided by a particular group. Examples of groups include but are not limited to a group including members of a user's social network and a group including other users with similar preferences to a user of the UE where the information is being provided. Identifying users with similar preferences to the user of the UE may consists of comparing reviews and/or ratings provided by the user of the UE with the reviews and/or ratings provided by other users and determining other users whose reviews and/or ratings demonstrate a threshold level of similarity to the reviews and/or ratings provided by the user of the UE.

Determining whether it is appropriate to request information from a business review and ratings service may require determining whether the identified entity is a business and/or whether the business review and ratings service has any information pertaining to the identified entity. In the event that it is appropriate to request information from the business review and ratings service for the entity deemed to have initiated the call, the UE will request information from the business review and ratings service for the identified entity.

The request may also include a request to return information pertaining to multiple entities that are determined by the server to be sufficiently likely to have initiated the communication if no single entity can be identified, within an appropriate confidence level, as responsible for initiating the communication. In such circumstances, the server may return information pertaining to multiple entities that are most likely responsible for initiating the communication as well as probabilities or probability ranges associated with each individual entity being responsible for initiating the communication. In the event that multiple entities are deemed to be sufficiently likely to have initiated the communication, the UE may determine whether or not it is appropriate to request information from a business review and ratings service for each of the entities. In the event that it is appropriate to request information from the business review and ratings service for one or more of the entities deemed to have been sufficiently likely to have initiated the communication, the UE will request information from the business review and ratings service for the one or more entities. Alternatively, the UE may make a single request and the server determines whether to request information pertaining to the identified entity from a business review and ratings service.

If the UE was successful in identifying the entity responsible for initiating the communication, the UE displays the information acquired from the server to the user. For example, when the communication is a telephone call, the information transmitted by the communication routing service with the incoming call notification may include one or more user reviews and/or ratings of the business, aggregate ratings of the business across various dimensions and on a scale provided by the review and ratings service, descriptions of the goods and services purveyed by the business, amenities provided by the business, and further characteristics of the business and the goods and services it provides, among others.

In some embodiments, if the communication routing service was unable to identify a single entity responsible for initiating the communication, but instead identified multiple entities sufficiently likely to have been responsible for initiating the call, then the UE provides the user with the identities of the entities deemed most likely to be responsible for the call and request that the user identify the responsible entity. The UE may thereafter display additional information obtained from one or more review and ratings services to the user pertaining to the entity identified by the user. The prompt issued by the UE may also provide the user with the option of declaring that none of the entities sufficiently likely to have been responsible for initiating the call actually initiated the call and to specify an altogether different entity as having been responsible for initiating the communication. In the event that the user specifies an altogether different entity as having been responsible for initiating the communication, the UE may request information pertaining to the identified entity from a business review and ratings service.

In the event that the user elects to rate the entity responsible for initiating the call, the UE receives the user's review and/or rating of the entity responsible for initiating the call and transmits the information to the business review and ratings service.

Figure 1:
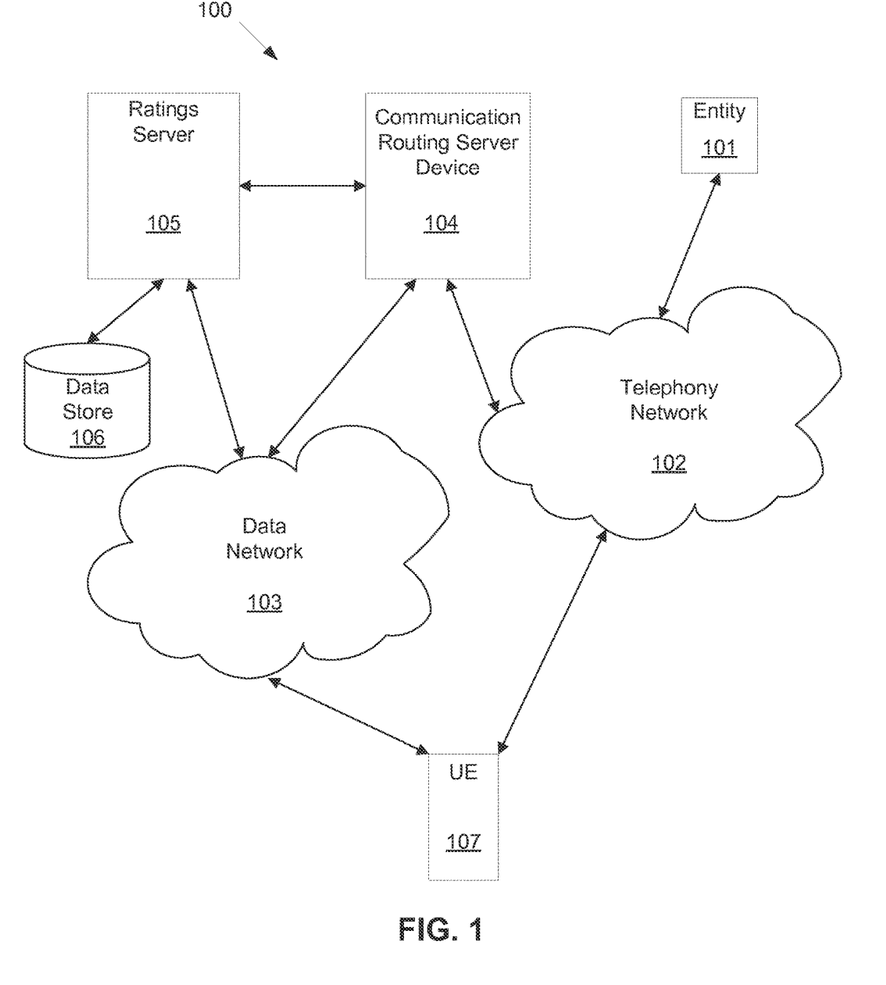
FIG. 1 is a block diagram of an exemplary system supporting a communications environment in which the real-time provision of review and ratings information and the crowd-sourcing of further reviews and ratings can be implemented.

Turning to the drawings, FIG. 1 is a block diagram of an exemplary system 100 supporting a communications environment in which various embodiments of the present invention may be implemented. In the system illustrated by FIG. 1, an entity 101 initiates a communication destined for a user equipment (UE) 107. The communication may be transmitted to the UE 107 through either a telephony network 102 or through a data network 103. Furthermore, communication data may be routed to the UE 107 through data network 103 while an audio and/or video component of the communication may be routed to the UE 107 through the telephony network 102. Alternatively, the telephony network 102 and the data network 103 may comprise the same network. Examples of UE 107 include, but are not limited to, portable, mobile, and/or stationary devices such as landline telephones, mobile telephones (including "smart phones"), laptop computers, tablet computers, desktop computers, personal digital assistants (PDAs), portable gaming devices, portable media players, and e-book readers.

A communication routing server device 104 is connected to the network and is configured to intercept the communication made by entity 101 prior to the communication reaching the UE 107. In the example where the communication is a call, the communication routing server device 104 may provide a telecommunications service, such as Google Voice, that links all UEs owned by a single user to a unique telephone number. The communication routing server device 104 may comprise multiple physical servers. Each server may be a physically separate machine or may be a process running within the same physical machine as another server. Furthermore, each of the servers that comprise the communication routing server device 104 may contain or be connected to a database or data store. Such databases and data stores include user information including a list of contacts for each user and information associated with such contacts. Information associated with each contact may include phone numbers, physical addresses, email addresses, names, business affiliations, and other personal and/or non-personal information. Furthermore, the servers that comprise the communication routing server device 104 may be connected to databases that have stored thereon information pertaining to a number of businesses. Such information may include a list of telephone numbers associated with a business as well as device identifiers that correspond to devices owned or operated by the business.

A ratings server 105 is connected to the communication routing server device 104. The ratings server 105 is also connected to one or more data stores 106. The data stores 106 include a variety of review and ratings information for a number of businesses and are maintained by a business review and ratings provider. The ratings server 105 is configured to query the one or more data stores 106 and to serve the review and ratings information stored thereupon to other devices, such as the communication routing server device 104.

Figure 2:
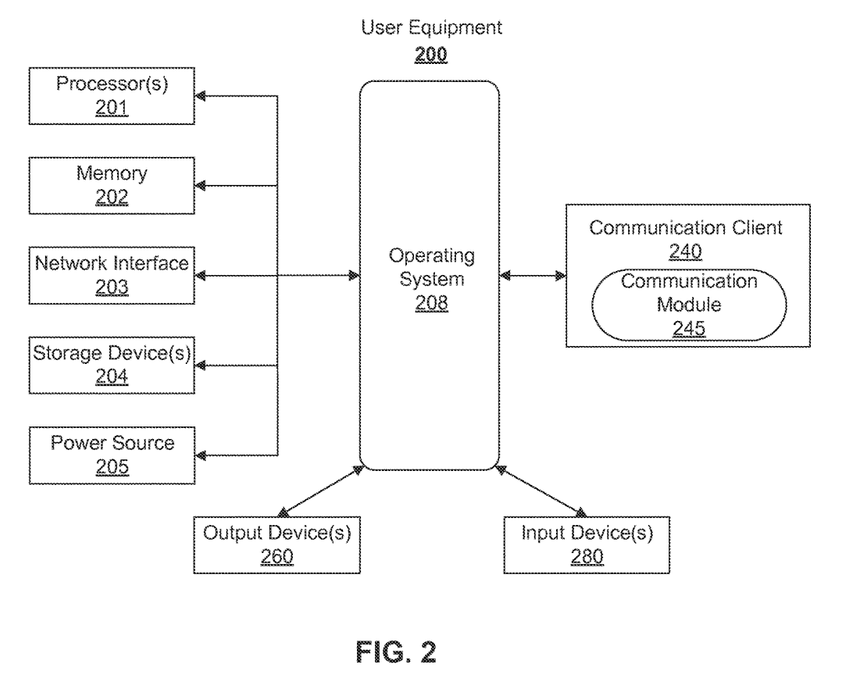
FIG. 2 is a block diagram of basic functional components for one of the pieces of user equipment in FIG. 1, according to one aspect of the disclosure.

Turning now to FIG. 2, one particular example of user equipment (UE) 200 is illustrated. In general, many other embodiments of the UE 200 may be used as long as a user may receive a call from an entity to be rated. In the illustrated embodiment of FIG. 2, the UE 200 includes one or more processors 201, memory 202, a network interface 203, one or more storage devices 204, power source 205, output device 260, and input device 280. The UE 200 also includes an operating system 208 and a communications client 240 that are executable by the client. In a conventional fashion, each of components 201, 202, 203, 204, 205, 260, 280, 208, and 240 are interconnected physically, communicatively, and/or operatively for inter-component communications.

As illustrated, processors 201 are configured to implement functionality and/or process instructions for execution within UE 200. For example, processors 201 execute instructions stored in memory 202 or instructions stored on storage devices 204. Memory 202, which may be a non-transient, computer-readable storage medium, is configured to store information within UE 200 during operation. In some embodiments, memory 202 includes a temporary memory, area for information not to be maintained when the UE 200 is turned off. Examples of such temporary memory include volatile memories such as random access memories (RAM), dynamic random access memories (DRAM), and static random access memories (SRAM). Memory 202 also maintains program instructions for execution by the processors 201.

Storage devices 204 also include one or more non-transient computer-readable storage media. Storage devices 204 are generally configured to store larger amounts of information than memory 202. Storage devices 204 may further be configured for long-term storage of information. In some examples, storage devices 204 include non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The UE 200 uses network interface 203 to communicate with external devices via one or more networks, such as the telephony network 102 or the data network 103 of FIG. 1, one or more wireless networks, wired networks, fiber optics networks, and other types of networks through which a call from a business may be transferred to a user. Network interface 203 may be a network interface card, such as an Ethernet card, an optical transceiver, a radio frequency transceiver, or any other type of device that can send and receive information. Other non-limiting examples of network interfaces include Bluetooth®, 3G and WiFi® radios in mobile computing devices, and USB. In some embodiments, the UE 200 uses network interface 203 to wirelessly communicate with an external device such as one or more services used by the communication routing service 104 of FIG. 1, a mobile phone, or other networked computing devices.

The UE 200 includes one or more input devices 280. Input device 280 is configured to receive input from a user through tactile, audio, and/or video feedback. Non-limiting examples of input device 280 include a presence-sensitive screen, a mouse, a keyboard, a voice responsive system, video camera, microphone or any other type of device for detecting a command from a user. In some examples, a presence-sensitive screen includes a touch-sensitive screen.

One or more output devices 260 are also included in UE 200. Output device 260 is configured to provide output to a user using tactile, audio, and/or video stimuli. Output device 260 may include a display screen (part of the presence-sensitive screen), a sound card, a video graphics adapter card, or any other type of device for converting a signal into an appropriate form understandable to humans or machines. Additional examples of output device 260 include a speaker, a cathode ray tube (CRT) monitor, a liquid crystal display (LCD), or any other type of device that can generate intelligible output to a user.

The UE 200 includes one or more power sources 205 to provide power to the client. Non-limiting examples of power source 205 include single-use power sources, rechargeable power sources, and/or power sources developed from nickel-cadmium, lithium-ion, or other suitable material.

The UE 200 includes an operating system 208 such as the Android® operating system. The operating system 208 controls operations of the components of the UE 200. For example, the operating system 208 facilitates the interaction of communications client 240 with processors 201, memory 202, network interface 203, storage device(s) 204, input device 280, output device 260, and power source 205. As illustrated in FIG. 2, communications client 240 includes communications module 245. Each of communications client 240 and communications module 245 typically includes program instructions and/or data that are executable by the UE 200.

In some embodiments, communications client 240 and/or communications module 245 form a part of operating system 208 executing on the UE 200. In other embodiments, communications client 240 receives input from one or more of the input devices 280 of the UE 200.

Figure 3:
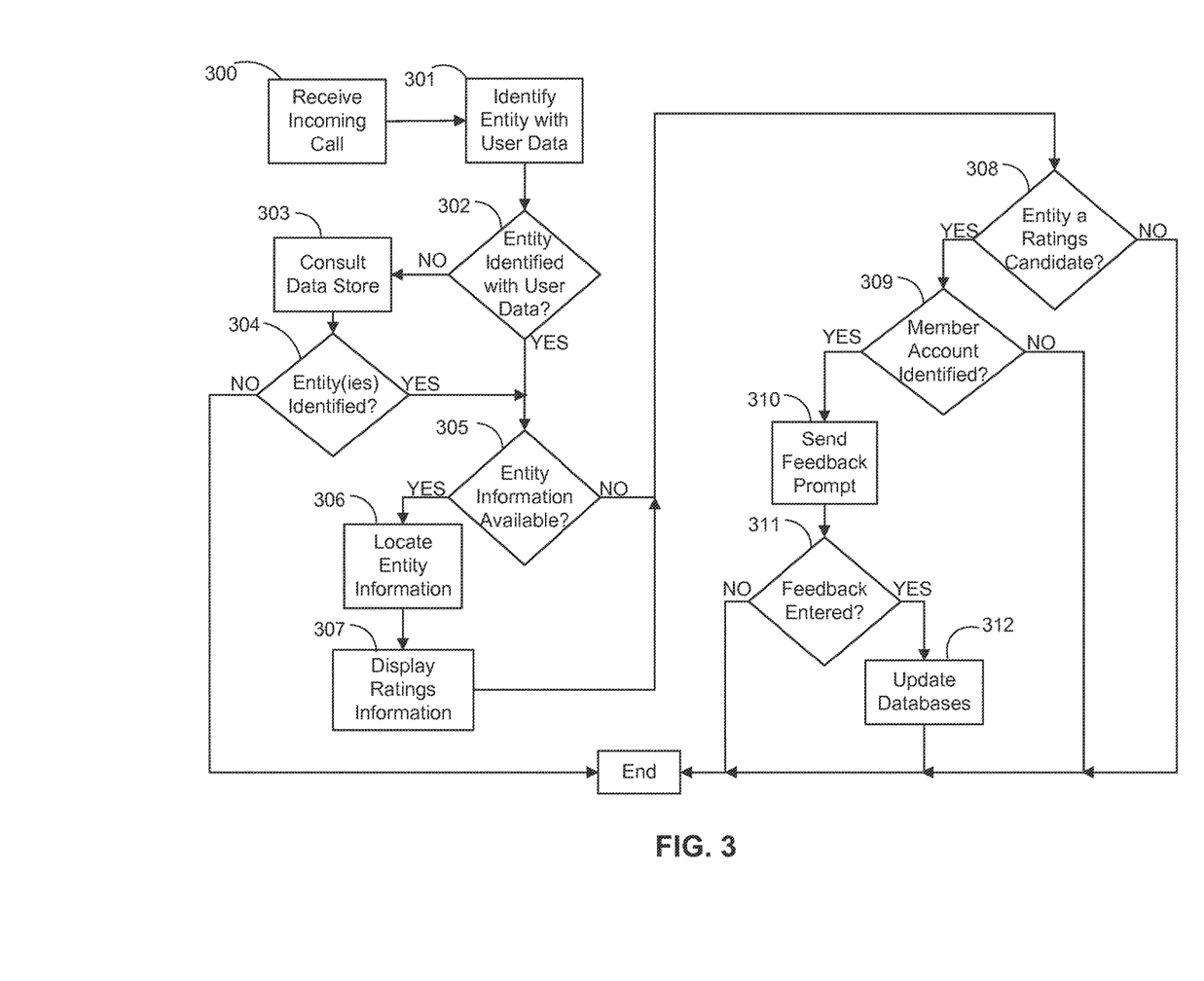
FIG. 3 is a flow diagram illustrating an example method for real-time provision of review and ratings information and the crowd-sourcing of further reviews and ratings triggered by action of the entity to be rated, according to one aspect of the disclosure.

FIG. 3 is a flow diagram illustrating an example method for crowd-sourcing ratings of entities in real-time triggered by action of the entity to be rated. At step 300, an incoming communication directed to a user equipment (UE) is received by a communication routing service. Such a communication may be an e-mail, an SMS message, an instant message (IM), an audio call through a voice over internet protocol (VoIP) network, an audio call through a cellular network, an audio call through a plain old telephone service (POTS) network, an audio-visual call over an internet protocol data network, or any other medium by which a business may attempt to contact a potential customer. A communication may also occur where a business's advertisement is displayed to a user on various devices such as a smart phone, a tablet computer, a laptop computer, a desktop computer, a television, and/or any other device capable of accessing the Internet. The communication may also be an advertisement places on a physical medium that corresponds to a particular geographic location of the advertisement.

At step 301, the communication routing service uses data arriving with the communication, e.g. the caller-line identification (CLID), and user data in order to identify the entity responsible for initiating the call. User data may include a contacts list of the callee. For example, the communication routing service may attempt to identify a user contact associated with the CLID transmitted with the incoming call.

At step 302, the communication routing service determines whether the entity responsible for initiating the communication was identified using the user information. If the communication routing service was able to identify the responsible entity solely with user information, then the method proceeds to step 305. However, if the communication routing service was unable to identify the entity responsible for initiating the communication solely with user information, then the method proceeds to step 303, where the communication routing service consults information stored in a data store in order to identify the entity. Step 303 may involve the communication routing service transmitting, to one or more servers with access to one or more databases, information associated with the communication and requests to return the identity of the entity responsible for initiating the call.

At step 304, the communication routing service determines whether the identity of the entity responsible for initiating the communication was established. Step 304 may also involve determining that a single entity could not be determined to be responsible for initiating the communication within an acceptable confidence level and further determining that multiple entities may have been responsible for initiating the communication, each with a probability or probability range of having done so. Alternatively, Step 304 may further involve determining that no identity could be established for the entity responsible for initiating the communication and prompting the user to supply identity information manually.

At step 305, the communication routing service determines whether information associated with the responsible entity is available from a ratings and review service. Determining that information associated with the responsible entity is available from a ratings and review service comprises receiving such information from a server in response to the request to return the identity of the entity responsible for initiating the communication in step 303. If no entity information is located, the method proceeds to step 308. If it is determined that entity information is available form a ratings and review service at 305, the method proceeds to step 306.

At step 306, the communication routing service aggregates and formats information available form one or more ratings and review services. At step 307, the communication routing service transmits the aggregated and formatted information to a user equipment (UE). Alternatively, the communication routing service may store the aggregated and formatted information in step 307 for later transmission to the UE.

At step 308, the communication routing service determines whether to develop crowd-sourced ratings and reviews of the entity responsible for initiating the communication. If it is determined that the entity is not a candidate for crowd sourced reviews and ratings, then the method terminates. If it is instead determined that the entity is a candidate for crowd sourced reviews and ratings, then the process proceeds to step 309.

At step 309, the communication routing service determines whether the user for whom the communication is directed to has an account with a ratings and review system. If it is determined that the user does not have an account with a ratings and review system, then the method terminates. If a user account is identified, then the method proceeds to step 310. Alternatively, the communication routing leaves the determination of whether the user has an account to the UE or an application running on the UE and proceed directly to step 310. At step 310 a request to submit a review and/or rating of the entity responsible for initiating the communication is transmitted to the UE. Alternatively, the request may be stored and bundled with additional information prior to transmission to the UE.

At step 311, the communication routing service determines that the user entered feedback pertaining to the entity responsible for initiating the communication, e.g. a review and/or rating. If no feedback was provided by the user, the process proceeds to END. At step 312, the communication routing service receives feedback provided by the user and transmits the feedback provided by the user to a data store. Transmission of user feedback to a data store may comprise formatting data provided by the user and transmitting such data to one or more servers connected to one or more databases.

Figure 4:
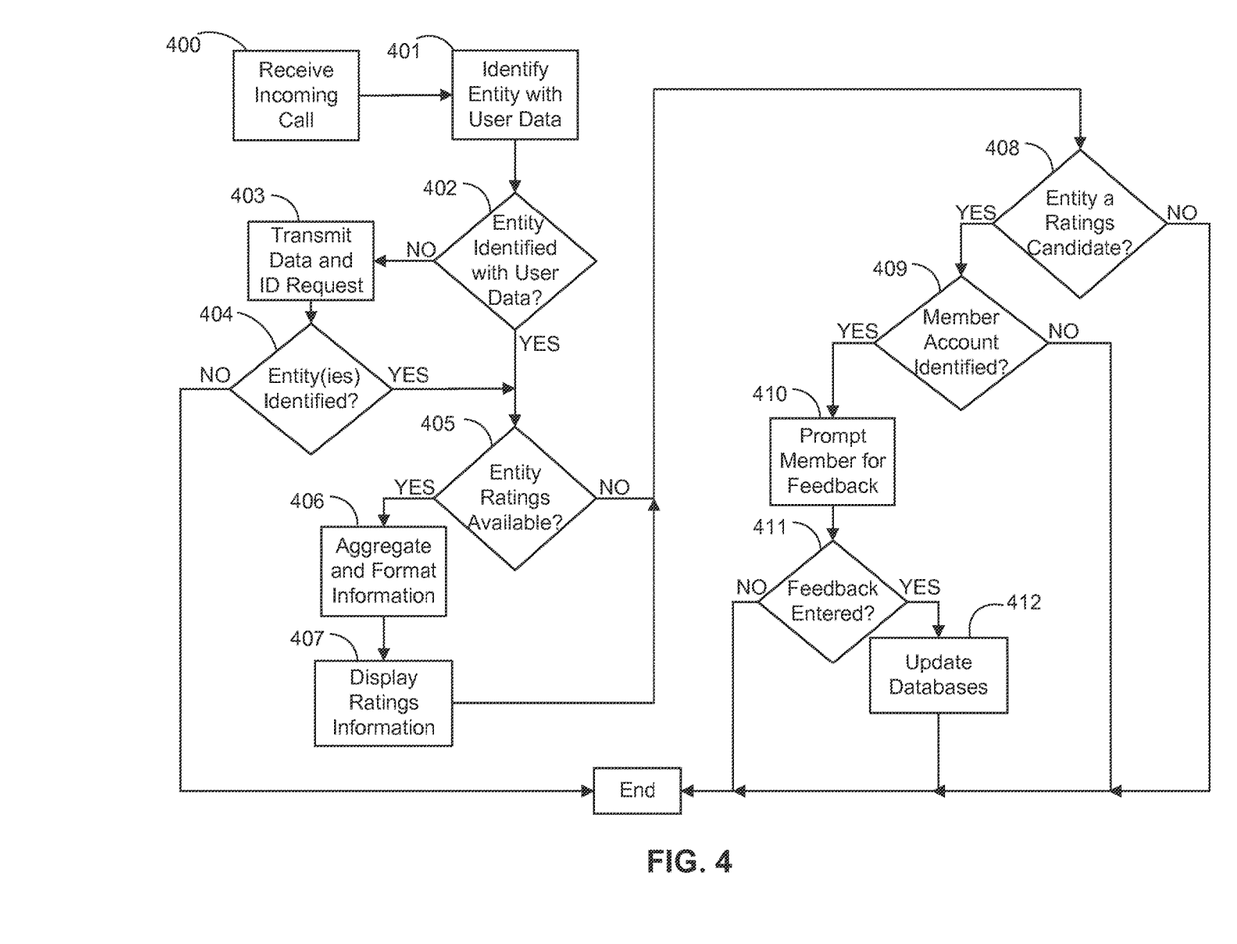
FIG. 4 is a flow diagram illustrating an example method for real-time provision of review and ratings information and the crowd-sourcing of further reviews and ratings triggered by action of the entity to be rated, according to one aspect of the disclosure.

FIG. 4 is a flow diagram illustrating an example method for crowd-sourcing ratings of entities in real time triggered by action of the entity to be rated. At step 400, an incoming communication initiated by an entity and directed to a user equipment (UE) is received by the UE.

At step 401, the UE uses data arriving with the communication, for example, the caller-line identification (CLID), and user data in order to identify the entity responsible for initiating the communication. User data may include contacts stored on the UE and information associated with each contact such as the contact's name, telephone number(s), email address, physical address, and a group to which the contact belongs. For example, the UE may attempt to identify a user contact associated with the CLID transmitted with the incoming communication.

At step 402, the UE determines whether the entity responsible for initiating the communication was identified using the user information. If the UE was able to identify the responsible entity solely with user information, then the method proceeds to step 405. However, if the UE was unable to identify the entity responsible for initiating the communication solely with user information, then the method proceeds to step 403, where the UE transmits data associated with the incoming communication and a request to provide the identity of the entity responsible for initiating the communication and, in the event that the entity's identity can be established, additional information pertaining to the entity. Such additional information includes review and ratings information pertaining to the entity responsible for initiating the communication.

At step 404, the UE determines whether the identity of the entity responsible for initiating the communication was established. Step 404 may also involve determining that a single entity could not be determined to be responsible for initiating the communication within an acceptable confidence level and further determining that multiple entities may have been responsible for initiating the communication, each with a probability or probability range of having done so.

At step 405, the UE determines whether information associated with the responsible entity is available from a ratings and review service. Determining that information associated with the responsible entity is available from a ratings and review service may comprise receiving such information from a server in response to the request to return the identity of the entity responsible for initiating the communication in step 403. If no entity information is located, then the method proceeds to step 408. If it is determined that entity information is available form a ratings and review service at 405, then the method proceeds to step 406.

At step 406, the UE aggregates and formats information available form one or more ratings and review services. At step 407, the UE displays the formatted information to the user. Alternatively, the UE may store the aggregated and formatted information in step 407 for later display to the user.

At step 408, the UE determines whether to develop crowd sourced ratings and reviews of the entity responsible for initiating the communication. If it is determined that the entity is not a candidate for crowd sourced reviews and ratings, the method terminates. If it is instead determined that the entity is a candidate for crowd sourced reviews and ratings, then the method proceeds to step 409.

At step 409, the UE determines whether the user for whom the communication is directed to has an account with a ratings and review system. If it is determined that the user does not have an account with a ratings and review system, then the method terminates. If a user account is identified, then the method proceeds to step 410. Alternatively, the UE may communication a user rating and review application on the UE and leave the determination of whether the user has an account to the user rating and review application running and proceed directly to step 410. At step 410 the UE prompts the user to submit a review and/or rating of the entity responsible for initiating the communication. Alternatively, the UE may communication a separate user rating and review application running on the UE and allow the user rating and review application prompt the user to submit a review and/or rating of the entity responsible for initiating the communication. The user prompt may also be stored and bundled with additional information prior to being displayed to the user.

At step 411, the UE determines whether the user entered feedback pertaining to the entity responsible for initiating the communication, e.g. a review and/or rating. If no feedback was provided by the user, then the method terminates. At step 412, the UE receives feedback provided by the user and transmits the feedback provided by the user to a data store. The data store may be located externally, i.e. on a server to which the UE may connect via the Internet, or may be located locally, i.e. on the UE. Transmission of user feedback to a data store may comprise formatting data provided by the user and transmitting such data to one or more servers connected to the data store. Transmission of the data provided by the user may occur immediately after the user provides such data or may occur after the passage of some time from when the user provided the data. For example, the UE may not have an internet connection when the incoming communication is received and the user data used to determine the identity of the entity responsible for initiating the communication may be a database on the UE such as the user's contact list. Under such circumstances, the user may provide a rating for the entity which is uploaded to an externally located data store at a later point in time at which an internet connection is established.

In the example embodiments, the various applications can be configured on any distributed or embedded platform within a single physical location or multiple locations. Similarly, some of the resources may reside on individual and separate platforms or they may be embedded into the server or other platforms. As such, embodiments contemplate that applications, resources, managers, servers, etc. may be joined or separated without diverging from their identities and functions. For example, a "server system" may include a single server platform or multiple server platforms.

All references, including publications, patent applications, and patents, cited herein are hereby incorporated by reference to the same extent as if each reference were individually and specifically indicated to be incorporated by reference and were set forth in its entirety herein.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to retrieve content (i.e., recorded voice-mails) from a content server (i.e., a voicemail server). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as, for example, to a city, ZIP code, or state level), so that a particular location of a user cannot be determined. Thus, the user may have control over how information is collected about him or her and used by the systems discussed herein.

The use of the terms "a" and "an" and "the" and "at least one" and similar referents in the context of describing the disclosed subject matter (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate the disclosed subject matter and does not pose a limitation on the scope of the invention unless otherwise claimed. No language in the specification should be construed as indicating any non-claimed element as essential to the practice of the invention.

Variations of the embodiments disclosed herein may become apparent to those of ordinary skill in the art upon reading the foregoing description. Skilled artisans may employ such variations as appropriate, and the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for crowd-sourcing ratings of entities triggered by an action of an entity being rated, the method comprising:
   receiving a notification of a call placed from an entity to a callee;
   identifying, by a processing device, multiple entities associated with a probability of being responsible for initiating the call that exceeds a threshold probability;
   identifying, by the processing device and using one or more ratings and review services, information associated with the multiple identified entities;
   providing the information associated with the multiple identified entities to a device associated with the callee;
   prompting the callee to select a single entity responsible for initiating the call;
   responsive to determining, by the processing device, to develop the crowd-sourcing ratings for one or more of the multiple entities, determining whether the callee has an account associated with the ratings and review system; and
   responsive to determining that the callee has the account associated with the ratings and review system:
      instructing the device associated with the callee to display a graphical user interface in connection with an incoming call notification, the graphical user interface comprising a widget that enables the callee to provide a rating for the single entity; and
      updating, by the processing device, a data store with the rating provided by the callee.

2. The method of claim 1, wherein the callee is prompted to select the single entity responsible for initiating the call either during the call or after the call is completed.

3. The method of claim 1, wherein identifying the multiple entities comprises performing a reverse lookup of data associated with the call.

4. The method of claim 3, wherein the data associated with the call includes at least one of an email address, a caller-line identification, and transcribed call audio.

5. The method of claim 1, wherein the information associated with the multiple identified entities comprises ratings of the multiple identified entities provided by at least one of one or more users of at least one of the one or more ratings and review services.

6. The method of claim 1, wherein providing the information associated with the multiple identified entities comprises transmitting instructions for the device to execute a user ratings application installed on the device.

7. A computing device comprising:
   one or more processors;
   an output device; and
   a storage device configured to store instructions that, when executed, cause the one or more processors to:
      receive a notification of a call placed from an entity to a callee;
      identify multiple entities associated with a probability of being responsible for initiating the call that exceeds a threshold probability;
      identify, using one or more ratings and review services, information associated with the multiple identified entities;
      provide the information associated with the multiple identified entities to a device associated with the callee;
      prompt the callee to select a single entity responsible for initiating the call;
      responsive to determining to develop the crowd-sourcing ratings for one or more of the multiple entities, determine whether the callee has an account associated with the ratings and review system; and
      responsive to determining that the callee has the account associated with the ratings and review system:
         instruct the device associated with the callee to display a graphical user interface in connection with an incoming call notification, the graphical user interface comprising a widget that enables the callee to provide a rating for the single entity; and update a data store with the rating provided by the callee.

8. The computing device of claim 7, wherein the instructions cause the one or more processors to prompt the callee to select the single entity responsible for initiating the call either during the call or after the call is completed.

9. The computing device of claim 7, wherein the instructions cause the one or more processors to identify the multiple entities by at least performing a reverse lookup of data associated with the call.

10. The computing device of claim 9, wherein the data associated with the call includes at least one of an email address, a caller-line identification, and transcribed call audio.

11. The computing device of claim 7, wherein the information associated with the multiple identified entities comprises ratings of the multiple identified entities provided by at least one of one or more users of at least one of the one or more ratings and review services.

12. The computing device of claim 7, wherein the instructions cause the one or more processors to provide the information associated with the multiple identified entities by at least transmitting instructions for the device to execute a user ratings application installed on the device.

13. A non-transitory computer-readable storage medium encoded with instructions that, when executed, cause one or more processors of a computing device to:

receive a notification of a call placed from an entity to a callee;

identify multiple entities associated with a probability of being responsible for initiating the call that exceeds a threshold probability;

identify, using one or more ratings and review services, information associated with the multiple identified entities;

provide the information associated with the multiple identified entities to a device associated with the callee;

prompt the callee to select a single entity responsible for initiating the call;

responsive to determining to develop the crowd-sourcing ratings for one or more of the multiple entities, determine whether the callee has an account associated with the ratings and review system; and responsive to determining that the callee has the account associated with the ratings and review system:

instruct the device associated with the callee to display a graphical user interface in connection with an incoming call notification, the graphical user interface comprising a widget that enables the callee to provide a rating for the single entity; and update a data store with the rating provided by the callee.

14. The non-transitory computer-readable storage medium of claim 13, wherein the instructions cause the one or more processors to prompt the callee to select the single entity responsible for initiating the call either during the call or after the call is completed.

15. The non-transitory computer-readable storage medium of claim 13, wherein the instructions cause the one or more processors to identify the multiple entities by at least performing a reverse lookup of data associated with the call.

16. The non-transitory computer-readable storage medium of claim 15, wherein the data associated with the call includes at least one of an email address, a caller-line identification, and transcribed call audio.

17. The non-transitory computer-readable storage medium of claim 13, wherein the information associated with the multiple identified entities comprises ratings of the multiple identified entities provided by at least one of one or more users of at least one of the one or more ratings and review services.

18. The non-transitory computer-readable storage medium of claim 13, wherein the instructions cause the one or more processors to provide the information associated with the multiple identified entities by at least transmitting instructions for the device to execute a user ratings application installed on the device.

* * * * *